United States Patent
Kim et al.

(10) Patent No.: US 10,750,169 B2
(45) Date of Patent: Aug. 18, 2020

(54) METHOD AND APPARATUS FOR INTRA CHROMA CODING IN IMAGE AND VIDEO CODING

(71) Applicant: MEDIATEK INC., Hsin-Chu (TW)

(72) Inventors: Jungsun Kim, San Jose, CA (US); Xiaozhong Xu, State College, PA (US); Shan Liu, San Jose, CA (US)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 16/338,511

(22) PCT Filed: Sep. 29, 2017

(86) PCT No.: PCT/CN2017/104352
§ 371 (c)(1),
(2) Date: Apr. 1, 2019

(87) PCT Pub. No.: WO2018/064956
PCT Pub. Date: Apr. 12, 2018

(65) Prior Publication Data
US 2019/0387222 A1     Dec. 19, 2019

Related U.S. Application Data

(60) Provisional application No. 62/405,284, filed on Oct. 7, 2016.

(51) Int. Cl.
*H04N 19/11* (2014.01)
*H04N 19/186* (2014.01)
*H04N 19/159* (2014.01)

(52) U.S. Cl.
CPC .......... *H04N 19/11* (2014.11); *H04N 19/159* (2014.11); *H04N 19/186* (2014.11)

(58) Field of Classification Search
None
See application file for complete search history.

(56) References Cited

U.S. PATENT DOCUMENTS

| 9,426,473 B2 | 8/2016 | Yu et al. | |
| 2011/0255591 A1* | 10/2011 | Kim | H04N 19/186 375/240.02 |

(Continued)

FOREIGN PATENT DOCUMENTS

| CN | 104205838 A | 12/2014 |
| CN | 104937936 A | 9/2015 |
| EP | 2 887 670 A1 | 6/2015 |

OTHER PUBLICATIONS

International Search Report dated Dec. 29, 2017, issued in application No. PCT/CN2017/104352.

(Continued)

*Primary Examiner* — Talha M Nawaz

(74) *Attorney, Agent, or Firm* — McClure, Qualey & Rodack, LLP

(57) ABSTRACT

A method and apparatus for chroma Intra prediction are disclosed. According to one method, a chroma Intra mode set comprising more than six chroma Intra coding modes are generated and chroma Intra-prediction encoding or decoding is applied to the current chroma block using a current chroma Intra mode selected from the chroma Intra mode set. According to another method, a chroma MPM list is determined and a current chroma Intra mode is signaled using chroma MPM process at the video encoding system or parsing the current chroma Intra mode using the chroma MPM process at the video decoding system, where the chroma MPM process comprises using a chroma MPM flag to indicate whether the current chroma Intra mode belongs to the chroma MPM list.

11 Claims, 9 Drawing Sheets

(56) References Cited

U.S. PATENT DOCUMENTS

| | | | |
|---|---|---|---|
| 2012/0177112 A1* | 7/2012 | Guo | H04N 19/182 |
| | | | 375/240.12 |
| 2013/0272380 A1* | 10/2013 | Chien | H04N 19/463 |
| | | | 375/240.02 |
| 2015/0071352 A1 | 3/2015 | Kim et al. | |
| 2015/0281708 A1 | 10/2015 | Chuang et al. | |
| 2015/0304670 A1 | 10/2015 | Liu et al. | |
| 2016/0269749 A1 | 9/2016 | Zhang et al. | |
| 2018/0048895 A1* | 2/2018 | Jeon | H04N 19/176 |
| 2018/0234679 A1* | 8/2018 | Heo | H04N 19/124 |

OTHER PUBLICATIONS

Gao, L., et al.; "Fast Intra Mode Decision Algorithm Based on Refinement in HEVC Circuit and Systems(ISCAS);" Jul. 2015; pp. 1-4.

\* cited by examiner

METHOD AND APPARATUS FOR INTRA CHROMA CODING IN IMAGE AND VIDEO CODING

CROSS REFERENCE TO RELATED APPLICATIONS

The present invention claims priority to U.S. Provisional Patent Application Ser. No. 62/405,284, filed on Oct. 7, 2016. The U.S. Provisional Patent Application is hereby incorporated by reference in its entirety.

FIELD OF THE INVENTION

The present invention relates to Intra coding in image and video coding. In particular, the present invention discloses new Intra prediction for the chroma component of color images or color video to improve the coding efficiency.

BACKGROUND AND RELATED ART

The High Efficiency Video Coding (HEVC) standard is developed under the joint video project of the ITU-T Video Coding Experts Group (VCEG) and the ISO/IEC Moving Picture Experts Group (MPEG) standardization organizations, and is especially with partnership known as the Joint Collaborative Team on Video Coding (JCT-VC). In HEVC, one slice is partitioned into multiple coding tree units (CTU). In main profile, the minimum and the maximum sizes of CTU are specified by the syntax elements in the sequence parameter set (SPS). The allowed CTU size can be 8×8, 16×16, 32×32, or 64×64. For each slice, the CTUs within the slice are processed according to a raster scan order.

The CTU is further partitioned into multiple coding units (CU) to adapt to various local characteristics. A quadtree, denoted as the coding tree, is used to partition the CTU into multiple CUs. Let CTU size be M×M, where M is one of the values of 64, 32, or 16. The CTU can be a single CU (i.e., no splitting) or can be split into four smaller units of equal sizes (i.e., M/2×M/2 each), which correspond to the nodes of the coding tree. If units are leaf nodes of the coding tree, the units become CUs. Otherwise, the quadtree splitting process can be iterated until the size for a node reaches a minimum allowed CU size as specified in the SPS (Sequence Parameter Set).

Furthermore, according to HEVC, each CU can be partitioned into one or more prediction units (PU). Coupled with the CU, the PU works as a basic representative block for sharing the prediction information. Inside each PU, the same prediction process is applied and the relevant information is transmitted to the decoder on a PU basis. A CU can be split into one, two or four PUs according to the PU splitting type. HEVC defines eight shapes for splitting a CU into PU, including 2N×2N, 2N×N, N×2N, N×N, 2N×nU, 2N×nD, nL×2N and nR×2N partition types. Unlike the CU, the PU may only be split once according to HEVC. The partitions shown in the second row correspond to asymmetric partitions, where the two partitioned parts have different sizes. After Intra/Inter prediction, the residues for each CU is partitioned into one or more transform units (TUs) and a 2D transform is applied to each transform unit (TU) for residual compression.

The HEVC coding comprises Inter prediction and Intra prediction. A smoothing operation is applied to the reference samples as a pre-processing step before calculating the prediction. This smoothing operation corresponds to applying an FIR-filter with filter weights[1,2,1]>>2, with low-pass characteristics to the samples belonging to the left column and the above row of the current TU (transform unit). The Intra prediction of each TU is produced with the reconstructed samples of neighboring TUs. The Intra prediction mode is selected from DC mode, planar mode, and 33 directional modes by encoder and signaled in the bitstream. FIG. 1 shows the 33 directional Intra prediction modes (i.e., mode 2 through mode 34) used for luma Intra prediction. The directional prediction modes are also referred as angular prediction modes.

An international standard organization called JVET (joint video exploration team) has been established by both ITU-T VCEG and ISO/IEC MPEG to study the next generation video coding technologies. Reference software called JEM (joint exploration model) is built up based on HEVC's reference software (HM), where DC mode, planar mode and 65 directional Intra prediction modes are included in JEM software for luma Intra prediction. FIG. 2 shows the 65 directional Intra prediction modes (i.e., mode 2 through mode 66) used for luma Intra prediction. Accordingly, there are a total of 67 luma Intra prediction modes in JEM.

Out of all 67 Intra prediction modes in JEM, six three modes are considered as most probable modes (MPM) for predicting the Intra prediction mode in current prediction block. A current mode is signaled using an MPM index and remaining mode. When MPM is not used, a flag selected_mode_flag is signaled to indicate the remaining mode being selected, which is coded using Truncated Binary (TB) with a maximum value of 45 or 4 bit Fixed-Length Code (FLC).

In JEM, the number of chroma Intra prediction modes is 6, which includes derived mode or direct mode (DM), Vertical mode (VER), horizontal mode (HOR), diagonal mode (DIA), DC mode and planar mode. When DM indicates that the mode is one of DC, planar, HOR and VER, VDIA is used instead of the mode, where VDIA corresponds to the diagonal direction from the top-right corner toward the bottom-left corner. For a DM-coded chroma block, the Intra mode for the chroma is inherited from the Intra mode of the collocated luma block. For a LM-coded chroma block, the predictor is derived based on linear model of the collocated luma block.

According to the JEM, for signaling the chroma Intra prediction mode, a flag indicating whether the mode is DM is signaled first. If it is a DM mode, the chroma Intra prediction mode is the same as the Intra prediction mode of a collocated luma block. If it is not DM, then another flag indicating whether the mode is LM is signaled. Both DM and LM are coded using context-based coding. If the mode is neither DM nor LM, a 2-bit fixed-length code is used to indicate the index of the mode.

The chroma Intra prediction according to the existing HEVC standard is not very flexible. Also, HEVC has very limited selection of chroma Intra prediction, which is not best for high quality videos with abundant colors. Especially, the current signaling method for the chroma Intra mode is not very coding efficient to cover wide range of Intra prediction modes. It is desirable to develop newer or more advanced chroma Intra prediction to improve the coding performance.

BRIEF SUMMARY OF THE INVENTION

A method and apparatus for chroma Intra prediction are disclosed. According to one method, input data associated with a current luma block and a current chroma block corresponding to a color block in a current color image are received; a luma Intra mode set comprising luma Intra coding modes and a chroma Intra mode set comprising more than six chroma Intra coding modes are generated; luma Intra-prediction encoding or decoding is applied to the current luma block using a current luma Intra mode selected from the luma Intra mode set and chroma Intra-prediction encoding or decoding is applied to the current chroma block using a current chroma Intra mode selected from the chroma Intra mode set.

In one embodiment, the step of generating the chroma Intra mode set comprises including more than three angular prediction modes in the chroma Intra mode set. For example, the chroma Intra mode set may include 17 or 9 angular prediction modes. In another embodiment, the step of generating the chroma Intra mode set comprises including same angular prediction modes as the luma Intra mode set or a subset of the luma Intra mode set in the chroma Intra mode set. For example, the subset of the luma Intra mode set includes 17, 9 or 5 angular prediction modes. In yet another embodiment, the step of generating the chroma Intra mode set comprises using a same total number of Intra modes as the luma Intra mode set. In yet another embodiment, the step of generating the chroma Intra mode set comprises determining a total number of Intra modes in the chroma Intra mode set depending on a block size of the current chroma block.

In one embodiment, the step of generating the luma Intra mode set comprises determining a total number of Intra modes in the luma Intra mode set depending on a block size of the current luma block. For example, more Intra modes are used for a larger block size or more Intra modes are used for a smaller block size.

In one embodiment, the current luma Intra mode is signaled by using luma MPM process at the video encoding system and parsed by using the luma MPM process at the video decoding system, and the current chroma Intra mode is signaled by using chroma MPM process at the video encoding system and parsed by using the chroma MPM process at the video decoding system, wherein the luma MPM process comprises using a luma MPM flag to indicate whether the current luma Intra mode belongs to a luma MPM list and the chroma MPM process comprises using a chroma MPM flag to indicate whether the current chroma Intra mode belongs to a chroma MPM list.

A method for chroma Intra coding using the most-probable-mode (MPM) process is also disclosed. According to this method, input data associated with a current luma block and a current chroma block corresponding to a color block in a current color image are received; a luma MPM (most-probably-mode) list and a chroma MPM list are determined; a current luma Intra mode is signaled using luma MPM process at the video encoding system or parsing the current luma Intra mode using the luma MPM process at the video decoding system, wherein the luma MPM process comprises using a luma MPM flag to indicate whether the current luma Intra mode belongs to the luma MPM list; a current chroma Intra mode is signaled using chroma MPM process at the video encoding system or parsing the current chroma Intra mode using the chroma MPM process at the video decoding system, wherein the chroma MPM process comprises using a chroma MPM flag to indicate whether the current chroma Intra mode belongs to the chroma MPM list; luma Intra-prediction encoding or decoding is applied to the current luma block according to the current luma Intra mode; and chroma Intra-prediction encoding or decoding is applied to the current chroma block according to the current chroma Intra mode.

In one embodiment, the step of determining the chroma MPM list comprises always including DM mode with index 0 and LM mode with index 1 in the chroma MPM list regardless of whether the DM mode or LM mode actually presents in neighboring blocks of the current chroma block used to derive the chroma MPM list. In another embodiment, the current luma Intra mode is signaled prior to the current chroma Intra mode and the step of determining the chroma MPM list comprises including the current luma Intra mode with index 0 in the chroma MPM list. In this case, a default chroma Intra mode list is used for the chroma Intra-prediction encoding or decoding and if the current luma Intra mode is not in the default chroma Intra mode list, the current luma Intra mode is added to the default chroma Intra mode list and a total number of the default chroma Intra mode list is incremented by 1. In yet another embodiment, a default chroma Intra mode list is used for the chroma Intra-prediction encoding or decoding and if a neighboring chroma Intra mode used by a neighboring chroma block of the current chroma block is not in the default chroma Intra mode list, the neighboring chroma Intra mode is added to the default chroma Intra mode list and a total number of the default chroma Intra mode list is incremented by 1.

In one embodiment, a chroma Intra mode list is used for the chroma Intra-prediction encoding or decoding and a remaining chroma Intra mode list is generated to include remaining chroma Intra modes not belonging to the chroma MPM list; wherein the chroma MPM process further comprises using a fixed-length code (FLC) to encode or decode the current chroma Intra mode depending on a total number of the remaining chroma Intra modes if the current chroma Intra mode belongs to the remaining chroma Intra mode list. In another embodiment, the chroma MPM process further comprises using truncated binarization (TB) to encode or decode the current chroma Intra mode if the current chroma Intra mode belongs to the remaining chroma Intra mode list. In yet another embodiment, the chroma MPM process further comprises using a chroma fixed-length code (FLC) and chroma truncated binarization (TB) to encode or decode the current chroma Intra mode if the current chroma Intra mode belongs to the remaining chroma Intra mode list; and wherein the luma MPM process also comprises using a luma fixed-length code and luma truncated binarization (TB) to encode or decode the current luma Intra mode if the current luma Intra mode belongs to a remaining luma Intra mode list. According to this embodiment, if the current chroma Intra mode belongs to the remaining chroma Intra mode list and a corresponding mode number of the current chroma Intra mode is a multiple of 4, a selected flag with a first value indicating the multiple of 4 is signaled and the current chroma Intra mode is encoded or decoded using a 4-bit FLC; and if the current chroma Intra mode belongs to the remaining chroma Intra mode list and the corresponding mode number of the current chroma Intra mode is not a multiple of 4, the selected flag with a second value indicating non-multiple of 4 is signaled and the current chroma Intra mode is encoded or decoded using the chroma TB. Furthermore, a flag is signaled to indicate whether the corresponding mode number of the current chroma Intra mode is a multiple of 4.

In another embodiment, the luma MPM process further comprises signaling a luma MPM index at the video encoding system or parsing the luma MPM index at the video decoding system if the current luma Intra mode belongs to the luma MPM list and the chroma MPM process further comprises signaling a chroma MPM index at the video encoding system or parsing the chroma MPM index at the video decoding system if the current chroma Intra mode belongs to the chroma MPM list; and wherein the luma MPM index is context-coded and the chroma MPM index is context-coded. The luma MPM index and the chroma MPM index may use separate contexts, or the luma MPM index and the chroma MPM index may share common contexts.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

As mentioned before, the existing chroma Intra prediction is not very flexible and there may be room for improving the performance. Also, the existing signaling of chroma Intra mode is not very efficient. Accordingly, various techniques to improve the chroma Intra prediction performance or signaling efficiency are disclosed as follows.

Number of Chroma Intra Prediction

In the existing HEVC standard, the chroma Intra prediction mode is limited to a small set of choices (i.e., 6 chroma Intra prediction modes). According to the present method, the number of chroma Intra prediction can be more than 6. In one embodiment, chroma Intra prediction can have more than 3 angular prediction modes.

Figure 1:
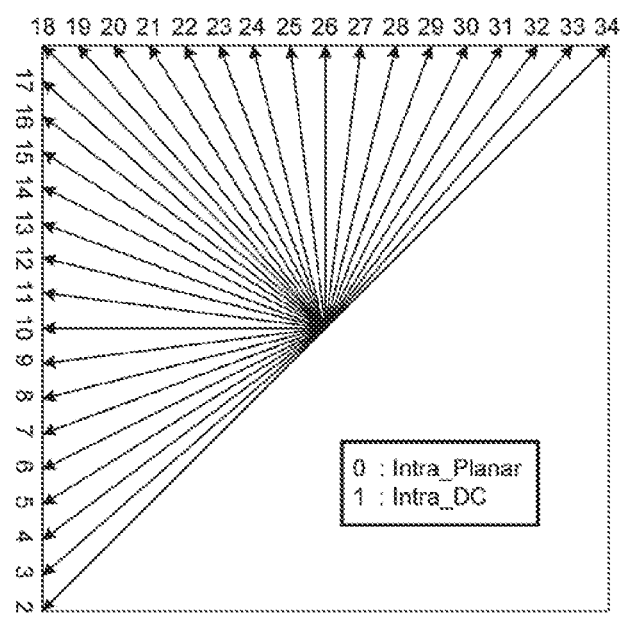
FIG. 1 illustrates the 33 directions for Intra prediction modes according to High Efficiency Video Coding (HEVC), where the directions are labelled from 2 to 34.
Figure 2:
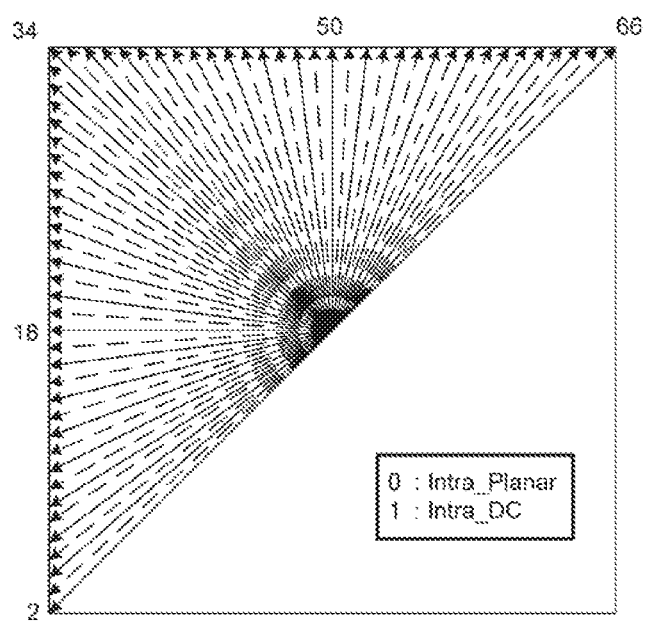
FIG. 2 illustrates the 65 angular Intra prediction modes used for the luma component as specified in the JEM.

In one example, the number of chroma Intra prediction modes can be the same as the number of luma Intra prediction modes. Accordingly, if the number of luma Intra modes is 67, the number of chroma Intra modes is 67 as well. The Intra prediction modes may include a set of explicit angular modes and one or more other non-angular modes such as planar, DC and LM. For example the chroma Intra prediction modes can include 63 angular prediction modes, planar, DC, LM and DM so that the total number of Intra modes (i.e., 67) is the same as the luma signal. The 63 angular prediction modes can be a subset of 65 angular modes used for luma Intra prediction. FIG. 2 illustrates the 65 angular Intra prediction modes used for the luma component as specified in the JEM. If more non-angular prediction modes are used, a corresponding number of angular prediction modes can be removed to keep the total number of chroma Intra prediction modes the same.

In another example, the number of chroma Intra prediction modes can be larger than the number for luma Intra prediction modes. Accordingly, if the number of luma Intra prediction modes is 67, then the number of chroma Intra prediction modes can be more than 67. Therefore, the chroma Intra prediction modes may include the 65 angular prediction modes and two or more other non-angular prediction modes, such as planar, DC, LM and DM.

In yet another example, the number of chroma Intra prediction modes can be smaller than the number of luma Intra prediction modes. Accordingly, if the number of luma Intra prediction modes is 67, the number of chroma Intra prediction modes can be less than 67, but larger than 6. In this case chroma Intra prediction modes can be a subset of prediction modes used for luma Intra prediction. Two examples for the case that the number of chroma Intra prediction modes can be smaller than the number of luma Intra prediction modes are shown as follows:

The number of angular modes used for chroma is 17 and the maximum number of chroma Intra prediction modes can be 21 by adding LM, DM, Planar and DC. The maximum number can be increased when there are more non-angular prediction modes.

The number of angular modes used for chroma is 9 and the maximum number of chroma prediction modes can be 13 by adding LM, DM, Planar and DC. The maximum number can be increased when there are more non-angular prediction modes.

In yet another example, the angular prediction modes for chroma can be a subset of the angular prediction modes used for luma Intra prediction. Examples for the case that the angular prediction modes for chroma are a subset of the angular prediction modes used for the luma Intra prediction are shown as follows:

The number of luma angular modes is 65 as indicated in FIG. 2 and the number of chroma angular modes is the same.

Figure 3:
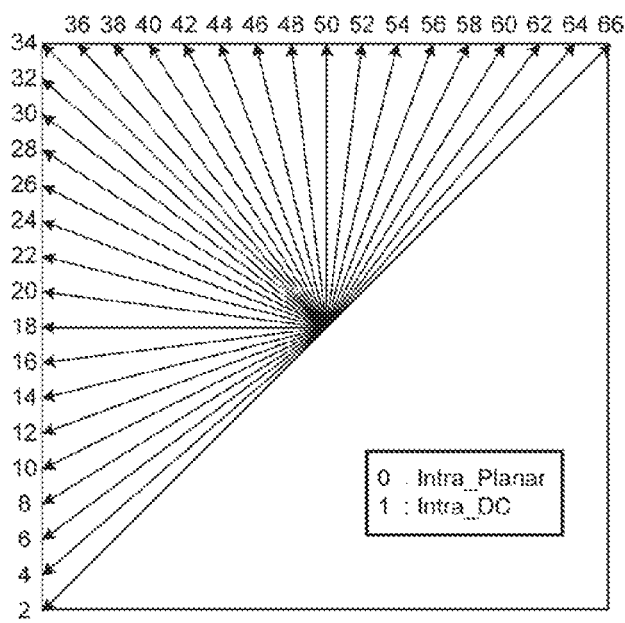
FIG. 3 illustrates an example of generating 33 angular chroma Intra modes from a subset of luma angular Intra modes by retaining every other luma angular Intra modes.

The number of chroma angular modes is 33, which correspond to even-numbered angular modes of FIG. 2. The subset with 33 angular modes is shown in FIG. 3, where the prediction mode angles are evenly distributed with two neighboring prediction directions 5.625° apart from each other. The mode numbers in FIG. 3 correspond to 2, 4, 6, 8, 10, 12, 14, 16, 18/HOR, 20, 22, 24, 26, 28, 30, 32, 34/DIA, 36, 38, 40, 42, 44, 46, 50/VER, 54, 58, 62 and 66/VDIA in FIG. 2. The mode numbers in FIG. 3 are for the purpose of illustrating corresponding prediction directions with respect to FIG. 2. These mode numbers can be re-numbered for chroma Intra modes (e.g. 1 through 33) as needed. Also, the prediction mode angles between neighboring prediction modes can be uneven.

Figure 4:
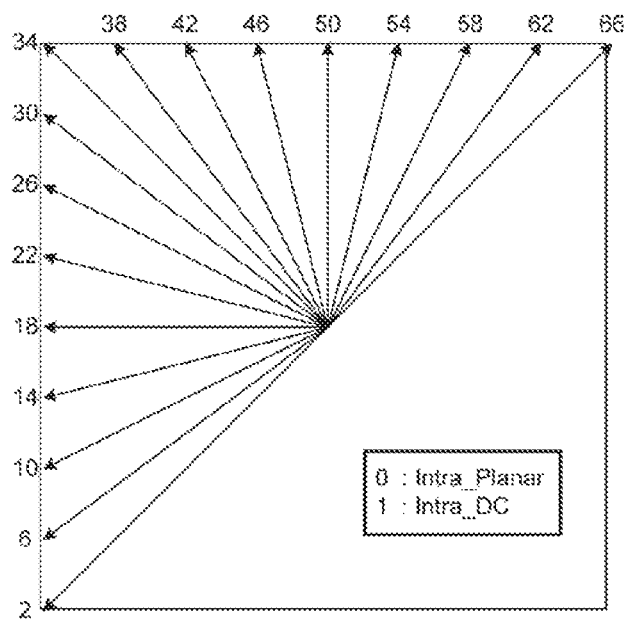
FIG. 4 illustrates an example of generating 17 angular chroma Intra modes from a subset of luma angular Intra modes by retaining one out of every four luma angular Intra modes.

The number of chroma angular mode is 17. The 17 angular prediction modes correspond to a subset of the modes in FIG. 2 by skipping 3 of every 4 modes as shown in FIG. 4. In this case, two neighboring prediction directions are 11.25° apart from each other. The mode numbers in FIG. 4 correspond to 2, 6, 10, 14, 18/HOR, 22, 26, 30, 34/DIA, 38, 42, 46, 50/VER, 54, 58, 62 and 66/VDIA in FIG. 2. The mode numbers in FIG. 4 are for the purpose of illustrating corresponding prediction directions with respect to FIG. 2. These mode numbers can be re-numbered for chroma Intra modes (e.g. 1 through 17) as needed. Also, the prediction mode angles between neighboring prediction modes can be uneven.

Figure 5:
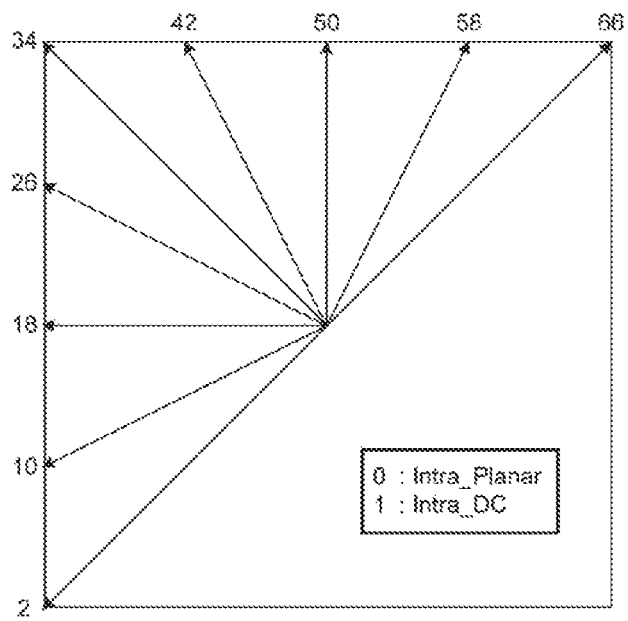
FIG. 5 illustrates an example of generating 9 angular chroma Intra modes from a subset of luma angular Intra modes by retaining one out of every eight luma angular Intra modes.

The number of chroma angular mode is 9. The 9 angular prediction modes correspond to a subset of the modes in FIG. 2 by skipping 7 of every 8 modes as shown in FIG. 5. In this case, two neighboring prediction directions are 22.5° apart from each other. The mode numbers in FIG. 5 correspond to 2, 10, 18/HOR, 26, 34/DIA, 42, 50/VER, 58 and 66/VDIA in FIG. 2. The mode numbers in FIG. 5 are for the purpose of illustrating corresponding prediction directions with respect to FIG. 2. These mode numbers can be re-numbered for chroma Intra modes (e.g. 1 through 9) as needed. Also, the prediction mode angles between neighboring prediction modes can be uneven.

Figure 6:
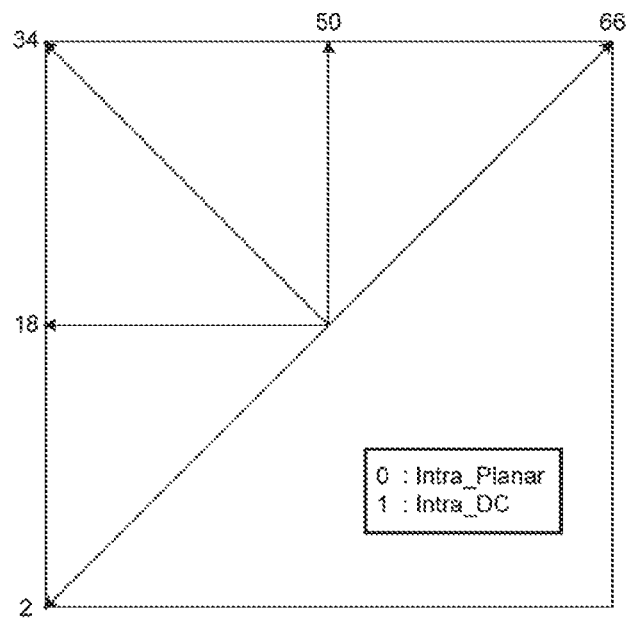
FIG. 6 illustrates an example of generating 5 angular chroma Intra modes from a subset of luma angular Intra modes by retaining one out of every sixth luma angular Intra modes.

The number of chroma angular mode is 5. The 5 angular prediction modes correspond to a subset of the modes in FIG. 2 by skipping 15 of every 16 modes as shown in FIG. 6. In this case, two neighboring prediction directions are 45° apart from each other and the mode angles are 45°, 90°, 135°, 180° and 225°. The mode numbers in FIG. 6 correspond to 2, 18/HOR, 34/DIA, 50/VER and 66/VDIA in FIG. 2. The mode numbers in FIG. 6 are for the purpose of illustrating corresponding prediction directions with respect to FIG. 2. These mode numbers can be re-numbered for chroma Intra modes (e.g. 1 through 5) as needed. Also, the prediction mode angles between neighboring prediction modes can be uneven.

Number of Chroma Intra Prediction Modes Dependent on the Block Size

The number of chroma Intra prediction modes can be variable depending on the coding block size. In one embodiment, the number is reduced when the block size is smaller. For example, 13 modes including 9 angular modes along with planar, DC, LM and DM are used for small blocks and 21 modes including 17 angular modes along with planar, DC, LM and DM are used for medium sized blocks and 67 modes including 63 angular modes along with planar, DC, LM and DM are used for large blocks. The block size can be defined as the width or height of a block. The block size can be derived based on the width and height of a block, such as the average, median, minimum, maximum, division or multiplication of the width and height. In another example, the block size can be defined as width*height.

The threshold to decide among small, medium and large can be set as an absolute value or decided by maximum depth. For example, blocks with width and height smaller than 16 can be included in the small block category. Blocks with width and height smaller than 32 and larger than or equal to 16 can be included in the medium block category. Blocks with width and height larger than or equal to 32 can be included in the large block category. In this case, the numbers of chroma Intra prediction modes can be different for chroma blocks of different sizes. In another example, the threshold is determined according to the number of pixels in the block (i.e., the area of the block). A block will be treated as a small block when the pixel number is smaller than 16*16 (i.e., 256); a block will be treated as a medium block when the pixel number is smaller than 32*32 and larger than or equal to 16*16; and a block will be treated as a large block when the pixel number is larger than or equal to 32*32.

Number of Luma Intra Prediction Modes

The number of luma Intra prediction mode can also be variable depending on the coding block size. For example, 67 modes are used for large blocks, 35 modes are used for medium blocks and 19 modes are used for small blocks. In another example, 19 modes are used for large blocks, 35 modes are used for medium blocks and 67 modes are used for small blocks. The present invention is not limited to the specific examples shown above. Other angular prediction can be defined for smaller number of Intra prediction modes. Also the number of luma Intra prediction modes can be set to be the same as the number of chroma Intra prediction modes, which can be variable or fixed per the coding block size.

Signaling of Chroma Intra Prediction Modes

When chroma Intra prediction has more than 6 modes, it can be signaled with the MPM index. For each chroma block, an MPM set is generated. If the mode of the current chroma block is same as one of the MPMs, an MPM flag is signaled as true and an index from the MPM set representing the mode of the current chroma block is signaled. If the mode is not the same as any of modes in the MPM set, the MPM flag is signaled as false and the remaining mode is signaled. Remaining mode means the index of the modes in the available Intra mode list. Since the mode is not any of MPMs, the MPMS are removed from the available Intra chroma mode list and the index for the current mode is adjusted by taking into account of the removed modes in MPM set. For example, the remaining mode can be calculated according to the following pseudo codes, where mpm[i] means i-th MPM and Imode means current Intra prediction mode.

for(i=MPM_NUM-1; i>=0; i--) {Imode=Imode>mpm[i]?(Imode-1):Imode}

Figure 7:
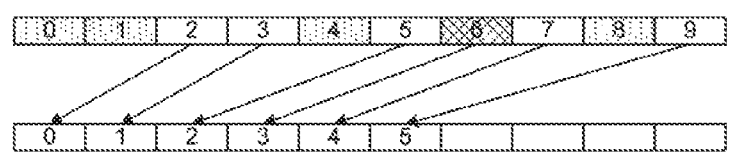
FIG. 7 illustrates an example of generating a remaining mode list, where most probable modes are {0, 1, 4, 8} and the current mode is 6 (i.e., not belonging to the MPM).

FIG. 7 illustrates an example according to the above pseudo codes. Assuming that most probable modes are {0, 1, 4, 8} and the current mode is 6 (i.e., not belonging to the MPM), modes 2, 3 and 5 will be moved to the remaining mode list with corresponding indices 0, 1 and 2. Mode 6 will be moved to a location corresponding to index 3 in the remaining list.

According to one embodiment, DM and LM can be always included in the chroma MPM list with index 0 and index 1 regardless of their actual presence in the neighboring block. Other MPM modes in the list can be acquired by any means.

According to another embodiment, DM can be included in the chroma MPM list as the actual mode of the corresponding luma component instead of as the DM mode. If the mode is not one from the default Intra chroma mode list, the maximum size of Intra chroma mode list is increased by one. For example, when the default list includes {LM, PLANAR, DC, 2, 6, 10, 14, 18, 22, 26, 30, 34, 38, 42, 46, 50, 54, 58, 62, 66} and the corresponding luma Intra prediction mode is 4, the maximum size will be 20. If the corresponding luma Intra prediction mode is 3, the list size is increased by one due to including mode 3. When quadtree plus binary tree block partition is applied to chroma and luma components separately, a chroma block may not be aligned with a luma block. In this invention, the definition of corresponding luma component is not limited.

According to another embodiment, if a neighboring block's mode is not one from the default list, the list can be increased by 1 to include the mode.

According to another embodiment, the remaining mode can be signaled by a fixed length code depending on the number of chroma Intra modes. Some examples are shown as follows:

When the number of total chroma Intra modes is 67 and the number of MPM is 6, the remaining mode can be signaled with 6-bit Fixed-Length Code (FLC) when the remaining mode is smaller than 60. Otherwise its quotient by 4 is signaled with 4-bit FLC. When the number of total chroma Intra prediction modes is 21 and the number of MPM is 6, the remaining mode can be signaled with 4-bit FLC.

When the number is 67 and the number of MPM is 3, the remaining mode can be signaled with 6-bit FLC. When the number is 21 and the number of MPM is 5, the remaining mode can be signaled with 4-bit FLC.

Also, the remaining mode can be signaled with truncated binarization (TB). When the list size is 21 and the number of MPM is 6, the remaining mode can be signaled as TB with maximum 15. When the list size is 67 and the number of MPM is 6, the remaining mode can be signaled as TB with maximum 61. Also, the remaining mode can be mixed-signaled as luma Intra prediction mode signaling. The selected modes (e.g. mode number being multiple of 4) are signaled with 4-bit FLC and the rest is signaled with truncated binarization. A flag (e.g. selected_flag) is signaled to indicate whether the mode is one of the selected modes (i.e., a mode being multiple of 4) or not (i.e., a mode being non-multiple of 4). This method can be applied to any number of Intra prediction modes by adjusting the method to choose the selected mode.

Figure 8:
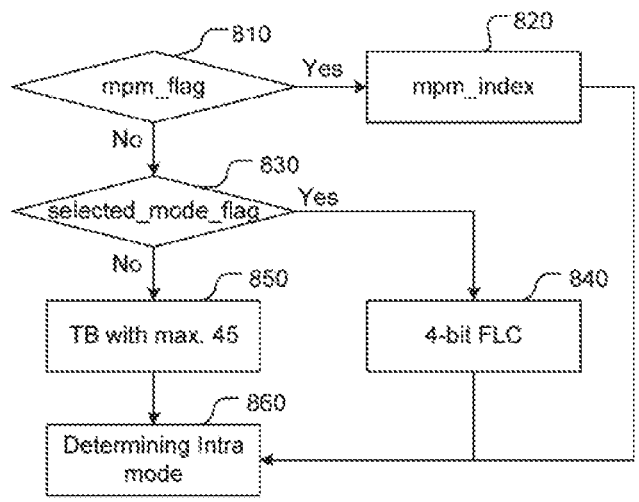
FIG. 8 illustrates an example of binarization process for the luma Intra prediction mode.

Chroma Intra prediction mode signaling can share common procedure with luma Intra prediction mode signaling. FIG. 8 illustrates an example of binarization process for the luma Intra prediction mode. Mpm_flag is first checked in step 810. If the value of mpm_flag corresponds to "true" (i.e., the "Yes" path), mpm_index is signaled as shown in step 820. If the value of mpm_flag corresponds to "false" (i.e., the "No" path), selected_mode_flag is checked in step 830. If the value of selected_mode_flag corresponds to "true" (i.e., the "Yes" path), a 4-bit FLC is signaled as shown in step 840. Otherwise (i.e., the "No" path from step 830), TB (truncated binary) with maximum value 45 is used as shown in step 850. Based on the mpm_index, the 4-bit FLC or TB, the Intra mode is determined in step 860.

As one example, the chroma Intra prediction may use 67 chroma modes. In this case, the binarization for the chroma component will be the same as the binarization process for the luma component. While the process flows for chroma and luma component are the same, however the final derivation of Intra prediction mode will be different.

In another example, the chroma Intra prediction may use 21 chroma Intra prediction modes. The chroma Intra prediction signaling shares common procedure with luma Intra prediction mode singling by setting the selected mode flag to be always true (or false depending on the implementation) and signal the remaining mode with 4-bit FLC. The determination of the coded bits will be different from determination for the luma component.

Figure 9:
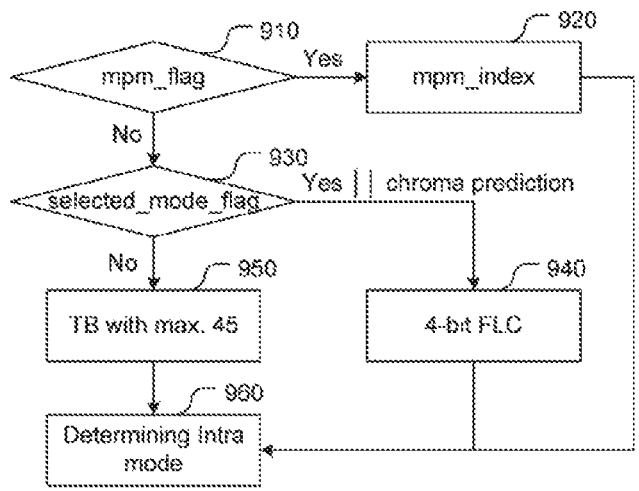
FIG. 9 illustrates an example of binarization process for the chroma Intra prediction mode according to an embodiment of the present invention.

Accordingly, the binarization procedure for the luma Intra mode according to an embodiment of the present invention may stay the same as that shown in FIG. 8. An exemplary binarization procedure for the chroma Intra mode according to an embodiment of the present invention is shown in the FIG. 9. The steps in FIG. 9 are similar to those in FIG. 8. Therefore, equivalent reference numbers (i.e., 910 through 960) are used for FIG. 9. For example, step 910 is equivalent to step 810, and step 960 is equivalent to step 860. However, step 930 is drawn for both the examples mentioned above. In other words, in the example of 67 chroma Intra modes, the value of selected_mode_flag in step 930 may cause the procedure to go to step 940 (i.e., 4-bit FLC) or step 950 (i.e., TB with max. 45). However, in the example of 21 chroma Intra modes, 4-bit FLC is always (i.e., the flow always goes from step 930 to step 940).

This invention is not limited to the way to interpret or derive chroma prediction modes for the coded bits. But the procedure below depicts one of examples when last method is used.

If the MPM flag, mpm_flag is true, MPM index, mpm_index is coded at the encoder side and parsed at the decoder side. Chroma prediction mode can be directly derived from the MPM list.

If the MPM flag, mpm_flag is not true, 4-bit FLC is coded at the encoder side and parsed at the decoder side. The Intra prediction mode can be determined according to the following exemplary pseudo codes, where Imode indicates the parsed value:

for(i=0; i<MPM_NUM; i++) mode+=(Imode>=mpm [i]);
Chroma_intra_pred_mode=Imode*4+2

Contexts for MPM of Chroma Intra Prediction

When MPM-index signaling uses context-based coding, luma and chroma components can share the contexts. For example, when i-th MPM index has context Ci for luma and context Ki for chroma, Ci will be same as Ki. Also, they can have separate contexts and Ci will not be same as Ki in this case. When MPM is DM or LM, MPM-index signaling can have its designated context. When i-th MPM is DM, its context Ki can be always different from other contexts Kj (i.e., j!=i). Also, when ith MPM is LM, its context Ki can be always different from other contexts Kj (i.e., j!=i). They can also share a context with other modes. When i-th MPM is DM, its context Ki can be same as contexts Kj (i.e., j!=i) for other mpms. Also, when i-th MPM is LM, its context Ki can be the same as contexts Kj (i.e., j!=i) for other mpms. Also the context Ki can be decided by the mode of the index. In this case, Ki is different from Kj when i-thmpm is different from j-thmpm.

The inventions disclosed above can be incorporated into various video encoding or decoding systems in various forms. For example, the inventions can be implemented using hardware-based approaches, such as dedicated integrated circuits (IC), field programmable logic array (FPGA), digital signal processor (DSP), central processing unit (CPU), etc. The inventions can also be implemented using software codes or firmware codes executable on a computer, laptop or mobile device such as smart phones. Furthermore, the software codes or firmware codes can be executable on a mixed-type platform such as a CPU with dedicated processors (e.g. video coding engine or co-processor).

Figure 10:
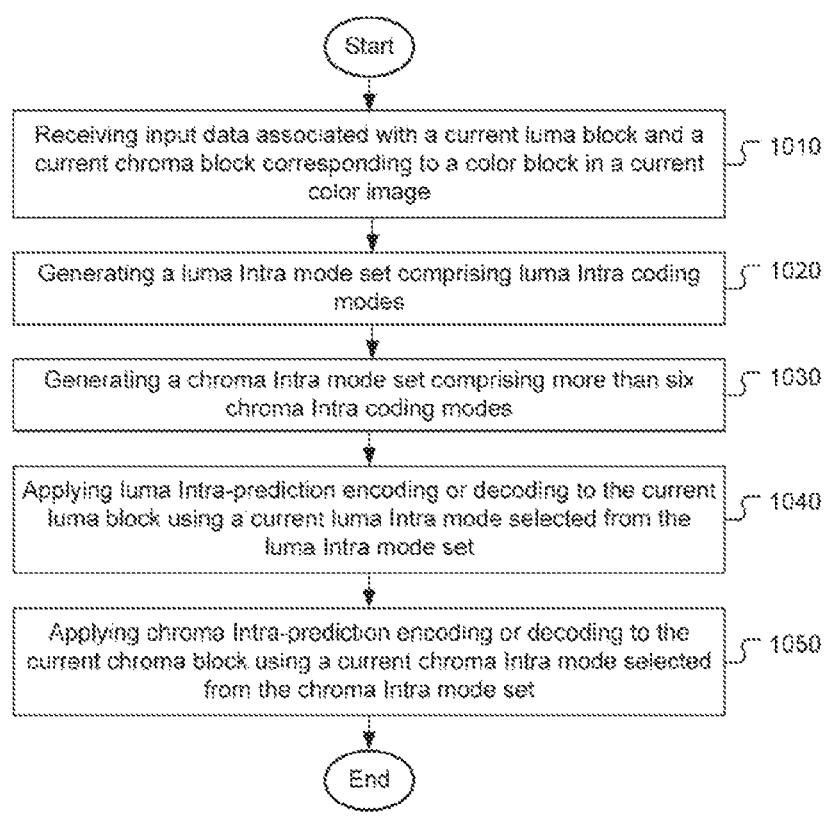
FIG. 10 illustrates a flowchart of an exemplary coding system for Intra prediction of chroma block according to an embodiment of the present invention.

FIG. 10 illustrates a flowchart of an exemplary coding system for Intra prediction of chroma block according to an embodiment of the present invention. According to this method, input data associated with a current luma block and a current chroma block corresponding to a color block in a current color image are received in step 1010. A luma Intra mode set comprising luma Intra coding modes is generated in step 1020. A chroma Intra mode set comprising more than six chroma Intra coding modes is generated in step 1030. Luma Intra-prediction encoding or decoding is applied to the current luma block using a current luma Intra mode selected from the luma Intra mode set in step 1040. Chroma Intra-prediction encoding or decoding is applied to the current chroma block using a current chroma Intra mode selected from the chroma Intra mode set in step 1050.

Figure 11:
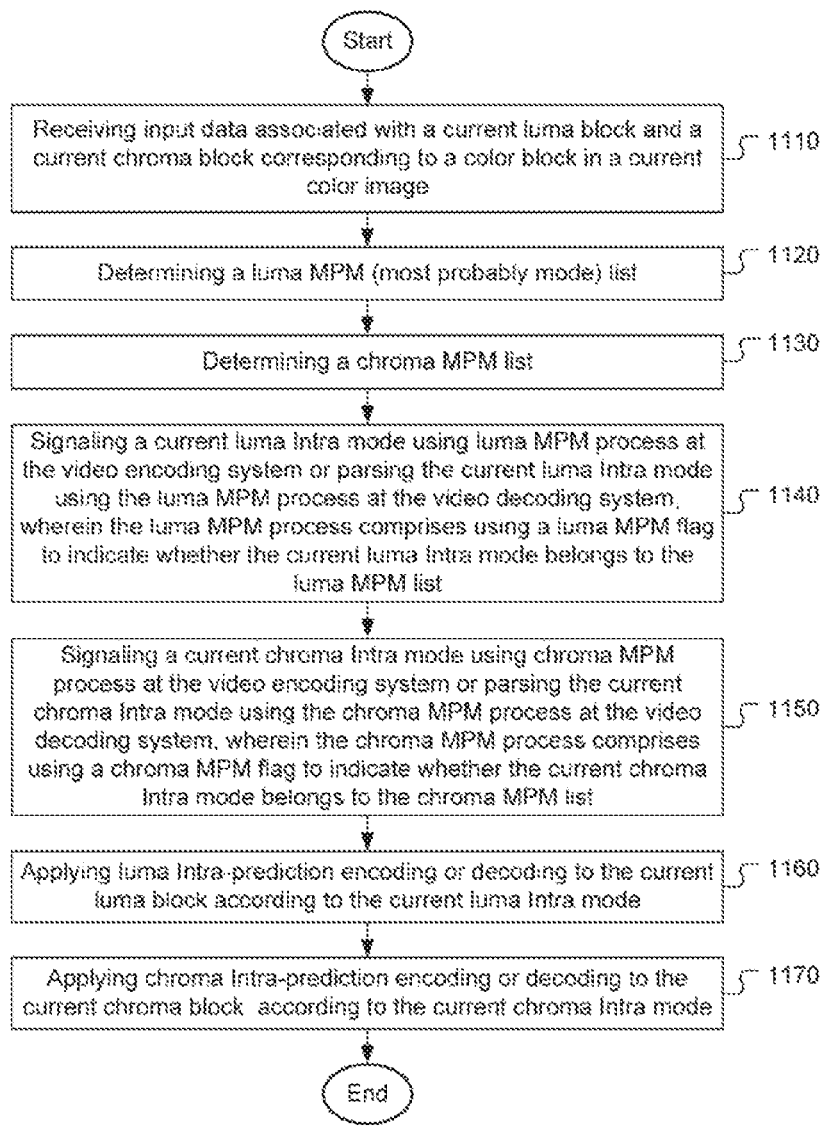
FIG. 11 illustrates a flowchart of another exemplary coding system for Intra prediction of chroma block according to an embodiment of the present invention.

FIG. 11 illustrates a flowchart of another exemplary coding system for Intra prediction of chroma block according to an embodiment of the present invention. According to this method, input data associated with a current luma block and a current chroma block corresponding to a color block in a current color image are received in step 1110. A luma MPM (most probably mode) list is determined in step 1120 and a chroma MPM list is determined in step 1130. A current luma Intra mode is signaled using luma MPM process at the video encoding system or the current luma Intra mode is parsed using the luma MPM process at the video decoding system in step 1140, wherein the luma MPM process comprises using a luma MPM flag to indicate whether the current luma Intra mode belongs to the luma MPM list. A current chroma Intra mode is signaled using chroma MPM process at the video encoding system or the current chroma Intra mode is parsed using the chroma MPM process at the video decoding system in step 1150, wherein the chroma MPM process comprises using a chroma MPM flag to indicate whether the current chroma Intra mode belongs to the chroma MPM list. Luma Intra-prediction encoding or decoding is applied to the current luma block according to the current luma Intra mode in step 1160. Chroma Intra-prediction encoding or decoding is applied to the current chroma block according to the current chroma Intra mode in step 1170.

The flowcharts shown are intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video encoding and decoding used by a video encoding system and video decoding system respectively, the method comprising:
receiving input data associated with a current luma block and a current chroma block corresponding to a color block in a current color image;
determining a luma MPM (most probable mode) list;
determining a chroma MPM list;
signaling a current luma Intra mode using a luma MPM process at the video encoding system or parsing the current luma Intra mode using the luma MPM process at the video decoding system, wherein the luma MPM process comprises using a luma MPM flag to indicate whether the current luma Intra mode belongs to the luma MPM list;
signaling a current chroma Intra mode using a chroma MPM process at the video encoding system or parsing the current chroma Intra mode using the chroma MPM process at the video decoding system, wherein the chroma MPM process comprises using a chroma MPM flag to indicate whether the current chroma Intra mode belongs to the chroma MPM list, wherein the current luma Intra mode is signaled prior to the current chroma Intra mode and said determining the chroma MPM list comprises including the current luma Intra mode with index 0 in the chroma MPM list;
applying luma Intra-prediction encoding or decoding to the current luma block according to the current luma Intra mode; and
applying chroma Intra-prediction encoding or decoding to the current chroma block according to the current chroma Intra mode, wherein a default chroma Intra mode list is used for the chroma Intra-prediction encoding or decoding and if the current luma Intra mode is not in the default chroma Intra mode list, the current luma Intra mode is added to the default chroma Intra mode list and a total number of the default chroma Intra mode list is incremented by 1.

2. The method of claim 1, wherein said determining the chroma MPM list comprises always including DM (direct mode) mode with index 0 and LM (luma predict chroma mode) mode with index 1 in the chroma MPM list regardless of whether the DM mode or LM mode actually presents in neighboring blocks of the current chroma block used to derive the chroma MPM list.

3. The method of claim 1, wherein a default chroma Intra mode list is used for the chroma Intra-prediction encoding or decoding and if a neighboring chroma Intra mode used by a neighboring chroma block of the current chroma block is not in the default chroma Intra mode list, the neighboring chroma Intra mode is added to the default chroma Intra mode list and a total number of the default chroma Intra mode list is incremented by 1.

4. The method of claim 1, wherein a chroma Intra mode list is used for the chroma Intra-prediction encoding or decoding and a remaining chroma Intra mode list is generated to include remaining chroma Intra modes not belonging to the chroma MPM list; wherein the chroma MPM process further comprises using a fixed-length code (FLC) to encode or decode the current chroma Intra mode depending on a total number of the remaining chroma Intra modes if the current chroma Intra mode belongs to the remaining chroma Intra mode list.

5. The method of claim 1, wherein a chroma Intra mode list is used for the chroma Intra-prediction encoding or decoding and a remaining chroma Intra mode list is generated to include remaining chroma Intra modes not belonging to the chroma MPM list; wherein the chroma MPM process further comprises using truncated binarization (TB) to encode or decode the current chroma Intra mode if the current chroma Intra mode belongs to the remaining chroma Intra mode list.

6. The method of claim 1, wherein a chroma Intra mode list is used for the chroma Intra-prediction encoding or decoding and a remaining chroma Intra mode list is generated to include remaining chroma Intra modes not belonging to the chroma MPM list; wherein the chroma MPM process further comprises using a chroma fixed-length code (FLC) and chroma truncated binarization (TB) to encode or decode the current chroma Intra mode if the current chroma Intra mode belongs to the remaining chroma Intra mode list; and wherein the luma MPM process also comprises using a luma fixed-length code and luma truncated binarization (TB) to encode or decode the current luma Intra mode if the current luma Intra mode belongs to a remaining luma Intra mode list.

7. The method of claim 6, wherein if the current chroma Intra mode belongs to the remaining chroma Intra mode list and a corresponding mode number of the current chroma Intra mode is a multiple of 4, a selected flag with a first value indicating the multiple of 4 is signaled and the current chroma Intra mode is encoded or decoded using a 4-bit FLC; and if the current chroma Intra mode belongs to the remaining chroma Intra mode list and the corresponding mode number of the current chroma Intra mode is not a multiple of 4, the selected flag with a second value indicating non-multiple of 4 is signaled and the current chroma Intra mode is encoded or decoded using the chroma TB.

8. The method of claim 7, wherein a flag is signaled to indicate whether the corresponding mode number of the current chroma Intra mode is a multiple of 4.

9. The method of claim 1, wherein the luma MPM process further comprises signaling a luma MPM index at the video encoding system or parsing the luma MPM index at the video decoding system if the current luma Intra mode belongs to the luma MPM list and the chroma MPM process further comprises signaling a chroma MPM index at the video encoding system or parsing the chroma MPM index at the video decoding system if the current chroma Intra mode belongs to the chroma MPM list; and wherein the luma MPM index is context-coded and the chroma MPM index is context-coded.

10. The method of claim 9, wherein the luma MPM index and the chroma MPM index use separate contexts, or the luma MPM index and the chroma MPM index share common contexts.

11. An apparatus for video encoding and decoding used by a video encoding system and video decoding system respectively, the apparatus comprising one or more electronic circuits or processors arranged to:
receive input data associated with a current luma block and a current chroma block corresponding to a color block in a current color image;
determine a luma MPM (most probable mode) list;
determine a chroma MPM list;
signal a current luma Intra mode using a luma MPM process at the video encoding system or parse the current luma Intra mode using the luma MPM process at the video decoding system, wherein the luma MPM process comprises using a luma MPM flag to indicate whether the current luma Intra mode belongs to the luma MPM list;
signal a current chroma Intra mode using a chroma MPM process at the video encoding system or parse the current chroma Intra mode using the chroma MPM process at the video decoding system, wherein the chroma MPM process comprises using a chroma MPM flag to indicate whether the current chroma Intra mode belongs to the chroma MPM list, wherein the current luma Intra mode is signaled prior to the current chroma Intra mode and said determine the chroma MPM list comprises including the current luma Intra mode with index 0 in the chroma MPM list;
apply luma Intra-prediction encoding or decoding to the current luma block according to the current luma Intra mode; and
apply chroma Intra-prediction encoding or decoding to the current chroma block according to the current chroma Intra mode, wherein a default chroma Intra mode list is used for the chroma Intra-prediction encoding or decoding and if the current luma Intra mode is not in the default chroma Intra mode list, the current luma Intra mode is added to the default chroma Intra mode list and a total number of the default chroma Intra mode list is incremented by 1.

* * * * *